United States Patent
Feng et al.

(10) Patent No.: US 9,775,057 B2
(45) Date of Patent: Sep. 26, 2017

(54) SERVICE SWITCHING METHOD, DEVICE AND SYSTEM FOR LOCAL COMMUNICATION NETWORK

(71) Applicant: ZTE Corporation, Shenzhen, Guangdong (CN)

(72) Inventors: Dejuan Feng, Shenzhen (CN); Hui Chen, Shenzhen (CN); Guohe Liang, Shenzhen (CN); Jingwei He, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 90 days.

(21) Appl. No.: 14/759,186

(22) PCT Filed: Jul. 18, 2013

(86) PCT No.: PCT/CN2013/079631
§ 371 (c)(1),
(2) Date: Jul. 2, 2015

(87) PCT Pub. No.: WO2013/167054
PCT Pub. Date: Nov. 14, 2013

(65) Prior Publication Data
US 2015/0334583 A1    Nov. 19, 2015

(30) Foreign Application Priority Data
Jan. 4, 2013    (CN) .......................... 2013 1 0000615

(51) Int. Cl.
*H04W 4/00*       (2009.01)
*H04W 24/02*      (2009.01)
(Continued)

(52) U.S. Cl.
CPC ......... *H04W 24/02* (2013.01); *H04L 65/1083* (2013.01); *H04W 24/10* (2013.01); *H04W 36/00* (2013.01)

(58) Field of Classification Search
CPC ....................................................... H04W 36/00
(Continued)

(56) References Cited

U.S. PATENT DOCUMENTS

| 6,546,017 | B1 * | 4/2003 | Khaunte | H04L 47/15 370/412 |
| 2004/0029536 | A1 * | 2/2004 | Hamatsu | G06F 21/725 455/95 |

(Continued)

FOREIGN PATENT DOCUMENTS

| CA | 2678456 A1 | 9/2008 |
| CN | 101287014 A | 10/2008 |

(Continued)

OTHER PUBLICATIONS

Supplementary European Search Report in European application No. 13788433.4, mailed on Jan. 22, 2016.

(Continued)

*Primary Examiner* — Guang Li
(74) *Attorney, Agent, or Firm* — Oppedahl Patent Law Firm LLC (57) ABSTRACT

A service switching method, device and system for a local communication network are described. The method includes that: a current terminal receiving a service switching starting instruction sends running service information to a selected target terminal, and sends a service switching request message to a server; the server receiving the service switching request message sends service information to the target terminal; the target terminal extracts service progress time from the service information sent by the current terminal and (Continued)

the service information sent by the server respectively, calculates a time difference according to the extracted service progress time, and sends the time difference to the server; and the server regulates a progress of the service information sent to the target terminal according to the time difference to make the progress consistent with a progress of the service information sent to the selected target terminal by the current terminal. By the disclosure, a service can be smoothly switched, and service discontinuity can be avoided.

10 Claims, 3 Drawing Sheets (51) Int. Cl.
*H04W 24/10* (2009.01)
*H04W 36/00* (2009.01)
*H04L 29/06* (2006.01)

(58) Field of Classification Search
USPC ............................................. 370/338
See application file for complete search history.

(56) References Cited

U.S. PATENT DOCUMENTS

| | | |
|---|---|---|
| 2008/0227454 A1 | 9/2008 | Damnjanovic |
| 2009/0180478 A1* | 7/2009 | Yu ................... H04L 12/4633 370/395.1 |
| 2010/0064336 A1 | 3/2010 | Jin |
| 2010/0088371 A1 | 4/2010 | Xu |
| 2011/0173292 A1 | 7/2011 | Patel |
| 2011/0181681 A1* | 7/2011 | Lee ..................... H04M 3/58 348/14.02 |
| 2011/0196973 A1 | 8/2011 | Shaheen |
| 2012/0244844 A1 | 9/2012 | Patel |
| 2014/0335820 A1* | 11/2014 | Zhang .............. H04L 12/1467 455/406 |

FOREIGN PATENT DOCUMENTS

| | | | |
|---|---|---|---|
| CN | 101631029 A | 1/2010 | |
| CN | 101783725 A | 7/2010 | |
| CN | 101909045 A | 12/2010 | |
| CN | EP 2296335 A1 * | 3/2011 | ......... H04L 65/4076 |
| CN | 102082770 A | 6/2011 | |
| CN | 102149008 A | 8/2011 | |
| CN | 103052121 A | 4/2013 | |
| EP | 2150014 A1 | 2/2010 | |
| EP | 2173115 A1 | 4/2010 | |
| EP | 2296335 A1 | 3/2011 | |
| WO | 2012121897 A1 | 9/2012 | |

OTHER PUBLICATIONS

"3rd Generation Partnership Project; Technical Specification Group Services and System Aspects; IP Multimedia Subsystem (IMS) Service Continuity; Stage 2 (Release 12)", 3GPP Standard; 3GPP TS 23.237, 3rd Generation Partnership Project (3GPP), Mobile Competence Centre; 650, Route Des Lucioles ; F-06921 Sophia-Antipolis Cedex; France, vol. SA WG2, No. V12.1.0, Dec. 13, 2012 (Dec. 13, 2012), pp. 1-169, XP050691052, [retrieved on Dec. 13, 2012] * chapter 4.3.1.3 * * chapter 5.3.2.2 and 5.3.2.3 * * chapter 6a.3.1.1 *, mailed on Dec. 13, 2012.

"3rd Generation Partnership Project; Technical Specification Group Services and Architecture; Feasibility Study on Multimedia Session Continuity; Stage 2 (Release 8)", 3GPP Standard; 3GPP TR 23.893, 3rd Generation Partnership Project (3GPP), Mobile Competence Centre; 650, Route Des Lucioles ; F-06921 Sophia-Antipolis Cedex; France, No. V8.0.0, Jun. 1, 2008 (Jun. 1, 2008), pp. 1-62, XP050364175, * chapter 5.1 * * chapter 5.4.2 * * chapter 6.5.5.1.2 Alternative 2 *, mailed on Jun. 1, 2008.

International Search Report in international application No. PCT/CN2013/079631, mailed on Oct. 17, 2013.

English Translation of the Written Opinion of the International Search Authority in international application No. PCT/CN2013/079631, mailed on Oct. 17, 2013.

* cited by examiner

SERVICE SWITCHING METHOD, DEVICE AND SYSTEM FOR LOCAL COMMUNICATION NETWORK

TECHNICAL FIELD

The disclosure relates to the communication network data transmission technology, and in particular to a service switching method, device and system for a local communication network.

BACKGROUND

Along with the development of an information technology, a family usually has multiple terminals, such as a mobile phone, a game machine, a Personal Computer (PC), a laptop, a television and a music player, these terminals may form a local communication network, and each terminal in the local communication network communicates with one another. The local communication network may be a near-field communication network, and may also be a local area network centred on a home gateway and a Wireless Fidelity (WIFI) hotspot.

At present, a service (such as an audio service, a video service and a data downloading service) running on a certain terminal (called a current terminal) may be switched to another terminal (target terminal) of the local communication network. The current terminal and the target terminal can communicate through different communication networks and servers. A service switching technology for the local communication network is as follows: the current terminal sends a service switching request to a server, and the server stops sending service information to the current terminal according to the received service switching request, and sends the service information to the target terminal.

However, due to communication network differences and terminal differences (such as differences in transmission time delays and coding and decoding manners), a progress of a service received by the target terminal may be inconsistent with a progress of the service finally running on the current terminal. That is, the progress of the service received by the target terminal may be ahead of the progress of the service finally running on the current terminal, or be behind the progress of the service finally running on the current terminal, which causes unsmooth switching of the service. Specifically, when the progress of the service received by the target terminal is ahead of the progress of the service finally running on the current terminal (for example, a play duration of an online video service received by the target terminal is 19 minutes, and a play duration of the online video service finally running on the current terminal is 20 minutes), the service which has run may repeatedly run on the target terminal; and when the progress of the service received by the target terminal is behind the progress of the service finally running on the current terminal (for example, the play duration of the online video service received by the target terminal is 21 minutes, and the final play duration of the online video service running on the current terminal is 20 minutes), the service running on the target terminal and the service finally running on the current terminal are discontinuous.

SUMMARY

In view of this, a main purpose of the embodiment of the disclosure is to provide a service switching method, device and system for a local communication network, which can smoothly switch a service.

In order to achieve the purpose, the technical solutions of the embodiment of the disclosure are implemented as follows.

A service switching method for a local communication network includes that:

sending, by a current terminal receiving a service switching starting instruction, running service information to a selected target terminal, and sending a service switching request message to a server;

sending, by the server receiving the service switching request message, service information to the target terminal;

extracting, by the target terminal, service progress time from the service information sent by the current terminal and the service information sent by the server respectively, calculating a time difference according to the extracted service progress time, and sending the time difference to the server; and regulating, by the server, a progress of the service information sent to the target terminal according to the time difference to make the progress consistent with a progress of the service information sent to the selected target terminal by the current terminal.

Preferably, the method may further include: before the running service information is sent to the selected target terminal, querying, by the current terminal, available target terminals in the local communication network, and generating a target terminal list.

Preferably, the method may further include: before the service information is sent to the target terminal, reading, by the server, locally stored target terminal capability information according to target terminal description information in the service switching request message, judging whether the target terminal can perform service switching or not according to the target terminal capability information and service description information in the service switching request message, and sending the service information to the target terminal when the target terminal can perform the service switching.

Preferably, the method may further include: after the server regulates the progress of the service information sent to the target terminal according to the time difference, stopping, by the server, sending the service information to the current terminal.

Preferably, there may be one or more target terminals.

A service switching method for a local communication network includes that:

sending, by a current terminal receiving a service switching starting instruction, running service information to a selected target terminal, and sending a service switching request message to a server;

sending, by the server receiving the service switching request message, service information to the target terminal;

extracting, by the target terminal, service progress time from the service information sent by the current terminal and the service information sent by the server respectively, and calculating a time difference according to the extracted service progress time; and regulating a progress of the service information sent by the server according to the time difference to make the progress consistent with a progress of the service information sent to the selected target terminal by the current terminal.

A terminal includes:

a service switching starting instruction receiving unit, configured to receive a service switching starting instruction;

a service information sending unit, configured to send running service information to a selected target terminal when the service switching starting instruction receiving unit receives the service switching starting instruction; and a service switching request message sending unit, configured to send a service switching request message to a server when the service switching starting instruction receiving unit receives the service switching starting instruction.

Preferably, the terminal may further include:

a target terminal list generation unit, configured to query available target terminals in a local communication network when the service switching starting instruction receiving unit receives the service switching starting instruction, and generate a target terminal list.

A server includes:

a service switching request message receiving unit, configured to receive a service switching request message from a current terminal;

a service information sending unit, configured to send service information to a target terminal when the service switching request message receiving unit receives the service switching request message;

a time difference receiving unit, configured to receive a time difference from the target terminal; and a service progress regulation unit, configured to regulate a progress of the service information sent to the target terminal by the service information sending unit according to the time difference received by the time difference receiving unit to make the progress consistent with a progress of service information sent to the selected target terminal by the current terminal.

Preferably, the service may further include:

a sending stopping unit, configured to control the service information sending unit to stop sending the service information to the current terminal after the service progress regulation unit regulates the progress of the service information sent to the target terminal by the service information sending unit.

Preferably, the server may further include:

a service switching judgment unit, configured to read locally stored target terminal capability information according to target terminal description information in the service switching request message received by the service switching request message receiving unit, judge whether the target terminal can perform service switching or not according to the target terminal capability information, and notify the service information sending unit to send the service information to the target terminal when the target terminal can perform the service switching.

A terminal includes:

a time difference calculation unit, configured to extract service progress time from service information sent by a current terminal and service information sent by a server respectively, and calculate a time difference according to the extracted service progress time; and a time difference sending unit, configured to send the time difference calculated by the time difference calculation unit to the server.

A terminal includes:

a time difference calculation unit, configured to extract service progress time from service information sent by a current terminal and service information sent by a server respectively, and calculate a time difference according to the extracted service progress time; and a service progress regulation unit, configured to regulate a progress of the service information sent by the server according to the time difference calculated by the time difference calculation unit to make the progress consistent with a progress of the service information sent to the selected target terminal by the current terminal.

A service switching system for a local communication network includes:

a current terminal, configured to send running service information to a selected target terminal when receiving a service switching starting instruction, and send a service switching request message to a server;

the server, configured to send service information to the target terminal when receiving the service switching request message from the current terminal, and regulate a progress of service information sent to the target terminal according to a time difference to make the progress consistent with a progress of the service information sent to the selected target terminal by the current terminal; and the target terminal, configured to extract service progress time from the service information sent by the current terminal and the service information sent by the server respectively, calculate the time difference according to the extracted service progress time, and send the time difference to the server.

Preferably, there may be one or more target terminals.

A service switching system for a local communication network includes that:

a current terminal, configured to send running service information to a selected target terminal when receiving a service switching starting instruction, and send a service switching request message to a server;

the server, configured to send service information to the target terminal when receiving the service switching request message; and the target terminal, configured to extract service progress time from the service information sent by the current terminal and the service information sent by the server respectively, calculate a time difference according to the extracted service progress time, and regulate a progress of the service information sent by the server according to the time difference to make the progress consistent with a progress of the service information sent to the selected target terminal by the current terminal.

From the above, according to the technical solutions of the embodiment of the disclosure, the current terminal receiving the service switching starting instruction sends the running service information to the selected target terminal, and sends the service switching request message to the server; the server receiving the service switching request message sends the service information to the target terminal; the target terminal extracts the service progress time from the service information sent by the current terminal and the service information sent by the server respectively, calculates the time difference according to the extracted service progress time, and sends the time difference to the server; and the server regulates the progress of the service information sent to the target terminal according to the time difference to make the progress consistent with the progress of the service information sent to the selected target terminal by the current terminal. Therefore, a service can be smoothly switched, and service discontinuity is avoided.

DETAILED DESCRIPTION

Figure 1:
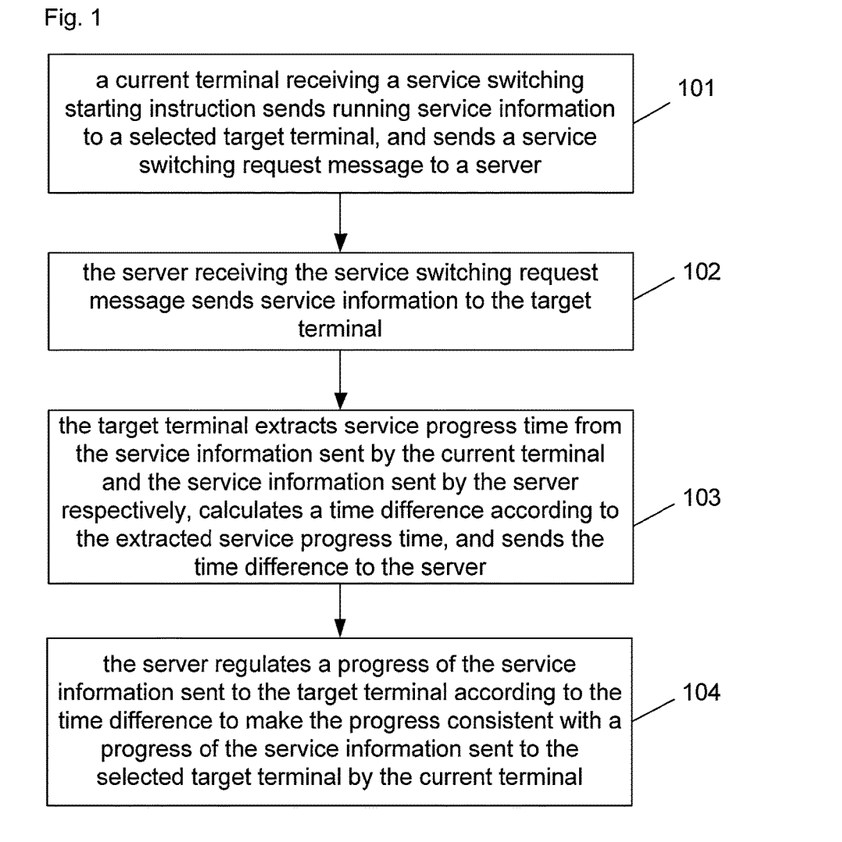
FIG. 1 is an implementation flowchart of a first embodiment of a service switching method for a local communication network according to the disclosure.

A first embodiment of a service switching method for a local communication network provided by the disclosure, as shown in FIG. 1, includes the following steps:

Step 101: a current terminal receiving a service switching starting instruction sends running service information to a selected target terminal, and sends a service switching request message to a server;

Step 102: the server receiving the service switching request message sends service information to the target terminal;

Step 103: the target terminal extracts service progress time from the service information sent by the current terminal and the service information sent by the server respectively, calculates a time difference according to the extracted service progress time, and sends the time difference to the server; and Step 104: the server regulates a progress of the service information sent to the target terminal according to the time difference to make the progress consistent with a progress of the service information sent to the selected target terminal by the current terminal.

Preferably, before the running service information is sent to the selected target terminal, the method further includes that:

the current terminal queries available target terminals in the local communication network, and generates a target terminal list.

Preferably, before the service information is sent to the target terminal, the method further includes that:

the server reads locally stored target terminal capability information according to target terminal description information in the service switching request message, judges whether the target terminal can perform service switching or not according to the target terminal capability information, and sends the service information to the target terminal when the target terminal can perform service switching.

Preferably, after the server regulates the progress of the service information sent to the target terminal according to the time difference, the method further includes that: the server stops sending the service information to the current terminal.

Preferably, there are one or more target terminals.

A second embodiment of a service switching method for a local communication network provided by the disclosure includes the following steps:

a current terminal receiving a service switching starting instruction sends running service information to a selected target terminal, and sends a service switching request message to a server;

the server receiving the service switching request message sends service information to the target terminal;

the target terminal extracts service progress time from the service information sent by the current terminal and the service information sent by the server respectively, and calculates a time difference according to the extracted service progress time; and a progress of the service information sent by the server is regulated according to the time difference to make the progress consistent with a progress of the service information sent to the selected target terminal by the current terminal.

Figure 2:
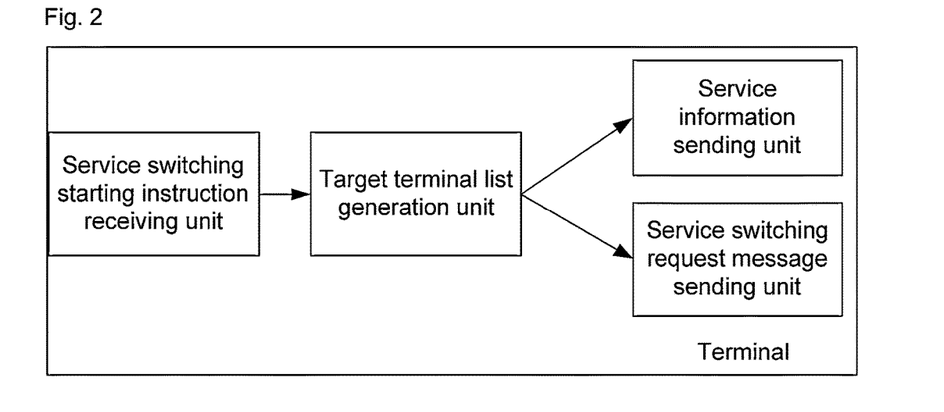
FIG. 2 is a structure diagram of an embodiment of a terminal according to the disclosure.

An embodiment of a terminal provided by the disclosure, as shown in FIG. 2, includes:

a service switching starting instruction receiving unit, configured to receive a service switching starting instruction;

a service information sending unit, configured to send running service information to a selected target terminal when the service switching starting instruction receiving unit receives the service switching starting instruction; and a service switching request message sending unit, configured to send a service switching request message to a server when the service switching starting instruction receiving unit receives the service switching starting instruction.

Preferably, the terminal further includes:

a target terminal list generation unit, configured to query available target terminals in a local communication network when the service switching starting instruction receiving unit receives the service switching starting instruction, and generate a target terminal list.

Figure 3:
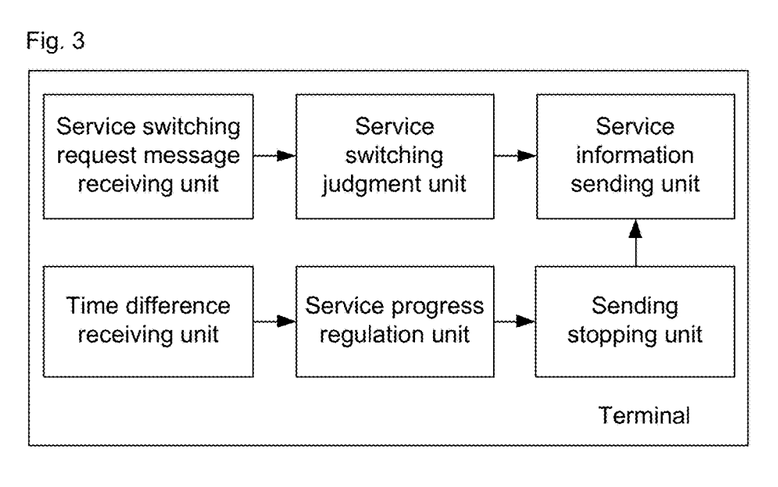
FIG. 3 is a structure diagram of an embodiment of a server according to the disclosure.

An embodiment of a server provided by the disclosure, as shown in FIG. 3, includes:

a service switching request message receiving unit, configured to receive a service switching request message from a current terminal;

a service information sending unit, configured to send service information to a target terminal when the service switching request message receiving unit receives the service switching request message;

a time difference receiving unit, configured to receive a time difference from the target terminal; and a service progress regulation unit, configured to regulate a progress of the service information sent to the target terminal by the service information sending unit according to the time difference received by the time difference receiving unit to make the progress consistent with a progress of service information sent to the selected target terminal by the current terminal.

Preferably, the server further includes:

a sending stopping unit, configured to control the service information sending unit to stop sending the service information to the current terminal after the service progress regulation unit regulates the progress of the service information sent to the target terminal by the service information sending unit.

Preferably, the server further includes:

a service switching judgment unit, configured to read locally stored target terminal capability information according to target terminal description information in the service switching request message received by the service switching request message receiving unit, judge whether the target terminal can perform service switching or not according to the target terminal capability information, and notify the service information sending unit to send the service information to the target terminal when the target terminal can perform service switching.

Figure 4:
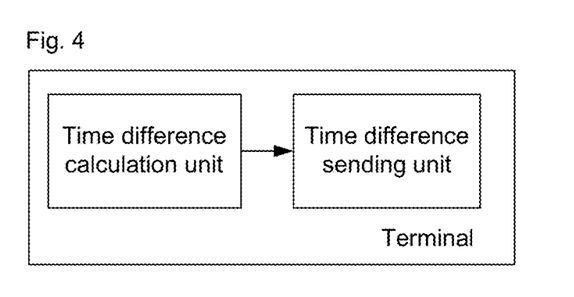
FIG. 4 is a structure diagram of an embodiment of a terminal according to the disclosure.

An embodiment of a terminal provided by the disclosure, as shown in FIG. 4, includes:

a time difference calculation unit, configured to extract service progress time from service information sent by a current terminal and service information sent by a server respectively, and calculate a time difference according to the extracted service progress time; and a time difference sending unit, configured to send the time difference calculated by the time difference calculation unit to the server.

An embodiment of a terminal provided by the disclosure includes:

a time difference calculation unit, configured to extract service progress time from service information sent by a current terminal and service information sent by a server respectively, and calculate a time difference according to the extracted service progress time; and a service progress regulation unit, configured to regulate a progress of the service information sent by the server according to the time difference calculated by the time difference calculation unit to make the progress consistent with a progress of the service information sent to the selected target terminal by the current terminal.

Figure 5:
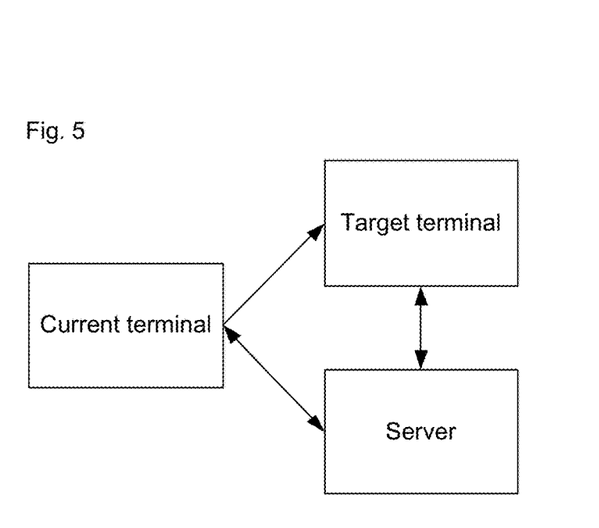
FIG. 5 is a structure diagram of an embodiment of a service switching system for a local communication network according to the disclosure.

An embodiment of a service switching system for a local communication network provided by the disclosure, as shown in FIG. 5, includes:

a current terminal, configured to send running service information to a selected target terminal when receiving a service switching starting instruction, and send a service switching request message to a server;

the server, configured to send service information to the target terminal when receiving the service switching request message from the current terminal, and regulate a progress of service information sent to the target terminal according to a time difference sent by the target terminal to make the progress consistent with a progress of the service information sent to the selected target terminal by the current terminal; and the target terminal, configured to extract service progress time from the service information sent by the current terminal and the service information sent by the server respectively, calculate the time difference according to the extracted service progress time, and send the time difference to the server.

Preferably, there are one or more target terminals.

The server may be a traditional server, and may also be a cloud computing technology-based virtual server.

The terminal refers to equipment with a user interface (such as input and output) and communication capability, may be a mobile phone, a game machine, a PC, a laptop, a television, a music player and the like, and may even be a server, and its most important task is to directly interact with a user and present a service for the user to use.

The current terminal and the target terminal may communicated with the server through different communication networks respectively; and the current terminal and the target terminal communicate with each other through the local communication network.

An embodiment of a service switching system for a local communication network provided by the disclosure includes:

a current terminal, configured to send running service information to a selected target terminal when receiving a service switching starting instruction, and send a service switching request message to a server;

the server, configured to send service information to the target terminal when receiving the service switching request message; and the target terminal, configured to extract service progress time from the service information sent by the current terminal and the service information sent by the server respectively, calculate a time difference according to the extracted service progress time, and regulate a progress of the service information sent by the server according to the time difference to make the progress consistent with a progress of the service information sent to the selected target terminal by the current terminal.

Figure 6:
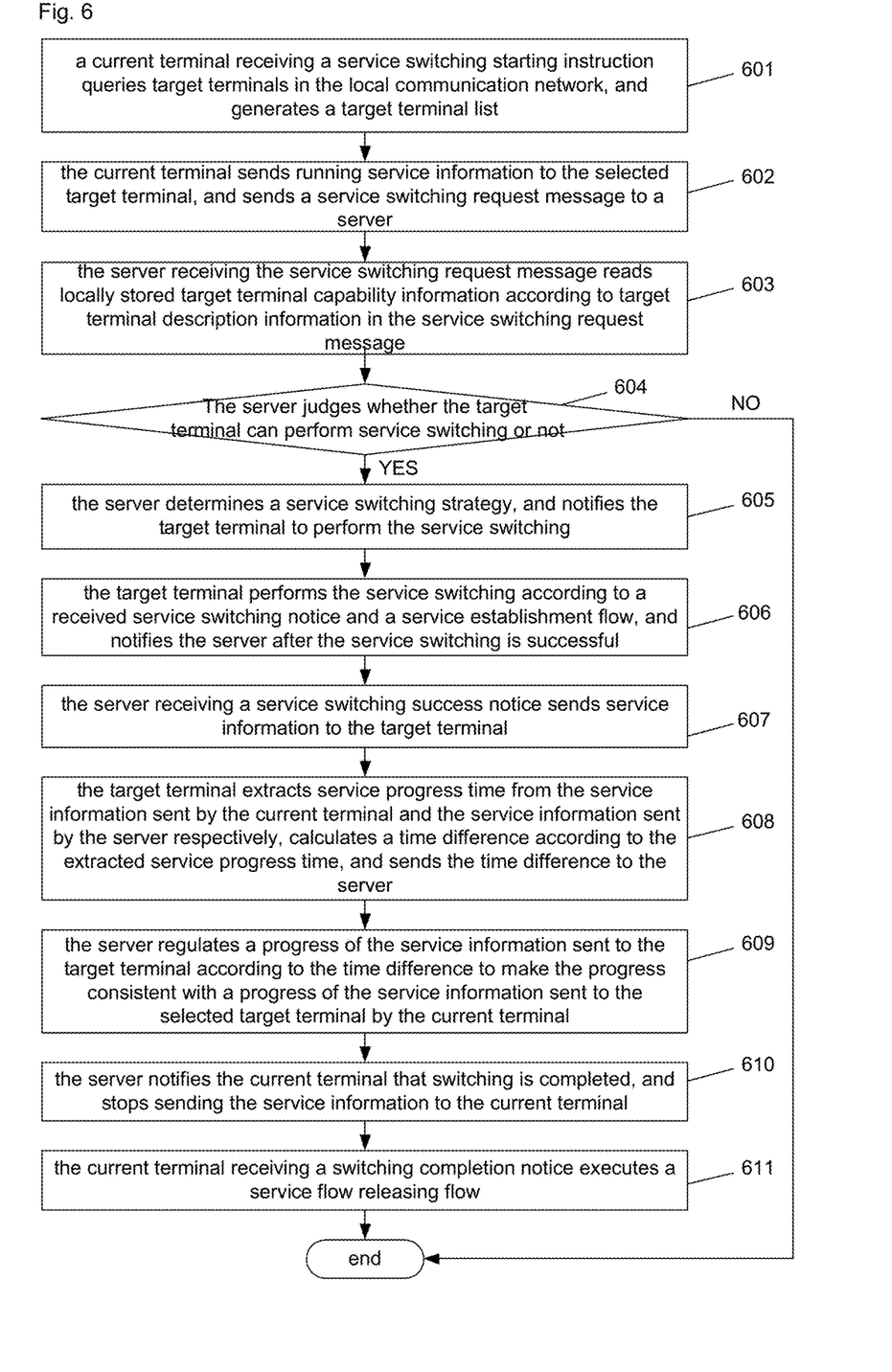
FIG. 6 is an implementation flowchart of a second embodiment of a service switching method for a local communication network according to the disclosure.

A third embodiment of a service switching method for a local communication network provided by the disclosure, as shown in FIG. 6, includes the following steps:

Step 601: a current terminal receiving a service switching starting instruction queries target terminals in the local communication network, and generates a target terminal list.

Here, a user may enable a service switching function to generate the service switching starting instruction by virtue of a program menu, a physical key, a virtual key, voice control and the like;

the target terminal list includes, besides terminal identifiers, terminal capability identifiers, terminal types, corresponding manufacturers, terminal version numbers, terminal levels (security levels, running priorities and the like), terminal capabilities and the like, the target terminal list is required to be kept in a specific format, and the format is appointed in advance by each related party such as a service provider, a server manufacturer and a terminal manufacturer;

the terminal capability refers to software and hardware resources which can be provided for a running service by the terminal; and the user may select one or more target terminals from the target terminal list as required.

Step 602: the current terminal sends running service information to the selected target terminal, and sends a service switching request message to a server.

Here, the target terminal may perform service demonstration to provide a more visual demonstration effect according to the received service information, and may perform confirmation with the current terminal in a user interaction manner.

Step 603: the server receiving the service switching request message reads locally stored target terminal capability information according to target terminal description information in the service switching request message.

Here, the target terminal description information refers to information such as the terminal identifier and the terminal type.

Step 604: the server judges whether the target terminal can perform service switching or not according to the target terminal capability information and service description information in the service switching request message, and step 605 is executed when the target terminal can perform the service switching; and when the target terminal cannot perform the service switching, the flow is ended.

Specifically, the server judges whether the target terminal can perform the service switching according to the target terminal capability information, the service description information in the service switching request message and a preset judgment criterion;

the judgment criterion is obtained by weighing each influence factor such as the capability, level, service running manner and user level of the terminal in a unified manner, and is set by a service operator; and here, the service description information refers to description about related information of a certain service, and the information may be a pre-appointed service identifier, or detailed information such as a service name and a service type, or the like.

Step 605: the server determines a service switching strategy, and notifies the target terminal to perform the service switching.

Step 606: the target terminal performs the service switching according to a service switching notice received and a service establishment flow, and notifies the server after the service switching is successful.

Step 607: the server receiving a service switching success notice sends service information to the target terminal.

Step 608: the target terminal extracts service progress time from the service information sent by the current terminal and the service information sent by the server respectively, calculates a time difference according to the extracted service progress time, and sends the time difference to the server.

The time difference refers to a time delay of the same content sent to the target terminal through different transmission paths.

Step 609: the server regulates a progress of the service information sent to the target terminal according to the time difference to make the progress consistent with a progress of the service information sent to the selected target terminal by the current terminal.

Step 610: the server notifies the current terminal that switching is completed, and stops sending the service information to the current terminal.

Step 611: the current terminal receiving a switching completion notice executes a service flow releasing flow.

The messages and requests sent by each device in step 601 to step 611 are required to be kept in a preset format.

The information interaction processes among the devices in step 601 to step 611 are required to follow preset flows, and can be completed by once interaction as well as multiple interaction.

A fourth embodiment of a service switching method for a local communication network according to the disclosure is introduced below.

In the embodiment, a user uses an Android smart mobile phone at home, the manufacturer of the mobile phone is A, the model number of the mobile phone is C100, and the terminal identifier is 3314570002. Wherein, the mobile phone may directly access a server for service access through a cellular communication network.

The user has a computer at home, the manufacturer of the computer is DUM, the model number of the computer is M480, the terminal identifier is 9377502589, and the computer is connected with the server through a home gateway. In a local network, the home gateway communicates with the computer and the mobile phone by virtue of WIFI.

It is supposed that the user is watching a movie through the mobile phone, the maker of the movie is N, and the name of the movie is FGH. The right protection level of the movie is "high", so that the movie can be played only locally in the server, and videos and audios are transmitted to the mobile phone through the server.

There is a service switching function key on a lateral surface of the mobile phone, and when the key is pressed down, a service switching function of the mobile phone may be enabled to generate a service switching starting instruction to automatically start the switching of a current service.

The user wants to switch the movie from the mobile phone to the computer for watching.

The embodiment includes the following steps:

Step 701: the mobile phone receiving the service switching starting instruction queries available target terminals in the local communication network, and generates a target terminal list.

There is only the computer in the target terminal list in the embodiment. A menu is popped up on a screen of the mobile phone, and the selectable target terminal computer is displayed.

Step 702: the mobile phone sends a played video content to the selected computer, pauses the movie, and sends a service switching request message to the server.

The user selects the computer from the popped-up menu, and clicks an OK option box to complete selection; and if the user does not select the computer, the service switching function is disabled;

the computer generates a content preview on the screen according to the received video content; and the service switching request message includes: service description information (the maker N and the name FGH of the movie), current terminal description information (the terminal identifier: 3314570002, the manufacturer A, the terminal type: mobile phone and the model number: C100) and target terminal description information (the manufacturer DUM, the terminal type: computer, the model number: M480 and the terminal identifier: 9377502589).

Step 703: the server receiving the service switching request message reads locally stored target terminal capability information according to the target terminal description information in the service switching request message, and determines that the playing of the movie can be supported by a hardware capability of the computer, namely the computer can perform service switching, according to the target terminal capability information and the service description information in the service switching request message.

Step 704: the server notifies the computer to perform the service switching, and the computer performs the service switching according to a service switching notice and a service establishment flow, and notifies the server after the service switching is successful.

Step 705: the server receiving a service switching success notice simultaneously sends videos and sounds of the movie to the computer.

Here, the server may regulate the playing definition of the movie, for example, from 720P suitable for the mobile phone to 1,080P suitable for the computer, according to the target terminal capability information and the service description information in the service switching request message.

Step 706: the computer extracts service progress time from the service information sent by the mobile phone and the service information sent by the server respectively, calculates a time difference according to the extracted service progress time, and sends the time difference to the server.

Step 707: the server regulates a progress of the movie sent to the computer according to the time difference to make the progress consistent with a progress of the movie sent to the computer by the mobile phone.

Step 708: the computer notifies the server after switching, and the server notifies the mobile phone that the switching is completed, and stops sending the videos and sounds of the movie to the mobile phone.

Step 709: the mobile phone receiving a switching completion notice executes a service flow releasing flow.

In the embodiment, the server supports two terminal content formats, one is mobile phone coding and decoding for a small screen of the mobile phone, and the other is PC coding and decoding for the computer. The server performs corresponding video service playing according to the terminal capability.

The server sends a video content to the mobile phone after mobile phone coding, and the mobile phone plays the video content.

When the mobile phone performs the service switching, the mobile phone transmits the video content to the computer, and the computer displays a video stream transmitted by the mobile phone for content previewing. At this moment, the server continues transmitting a video service to the mobile phone. In order to fully utilize the capability of the computer, the server selects PC coding and decoding to provide a subsequent video content for the computer.

Since the video of the mobile phone has been transmitted to the computer in advance through an internal network, the previewed mobile phone video content and the newly switched PC video content exist on the same terminal, the video content can be smoothly switched, and service continuity is achieved.

A fifth embodiment of a service switching method for a local communication network according to the disclosure is introduced below.

Step 801: a current terminal receiving a service switching starting instruction queries available target terminals in the local communication network, and generates a target terminal list.

Step 802: the current terminal sends running service information to a selected target terminal, and sends a service switching request message to a server.

Step 803: the server receiving the service switching request message reads locally stored target terminal capability information according to target terminal description information in the service switching request message.

Step 804: the server judges whether the target terminal can perform service switching or not according to the target terminal capability information and service description information in the service switching request message, and step 805 is executed when the target terminal can perform the service switching; and when the target terminal cannot perform the service switching, the flow is ended.

Step 805: the server determines a service switching strategy, and notifies the target terminal to perform the service switching.

Step 806: the target terminal performs the service switching according to a received service switching notice and a service establishment flow, and notifies the server after the service switching is successful.

Step 807: the server receiving a service switching success notice stops transmitting service information to the current terminal, and notifies the current terminal to execute a service flow releasing flow after the service information is completely forwarded.

Step 808: the server sends the service information to the target terminal.

Step 809: the target terminal extracts service progress time (also called a timestamp) from the service information sent by the current terminal and the service information sent by the server respectively, and calculates a time difference according to the extracted timestamps.

The time difference refers to a time delay of the same content sent to the target terminal through different transmission paths.

Step 810: the target terminal regulates a display duration of the service information sent by the server according to the time difference to make the displayed service progress consistent with a progress of the service information sent to the selected target terminal by the current terminal.

Specifically, when the progress of the service information sent by the server is ahead of the progress of the service information sent by the current terminal, the service information sent by the server is delayed to be displayed, for example, the service sent by the server is cached to realize delayed display; and when the progress of the service information sent by the server is behind the progress of the service information sent by the current terminal, the service information sent by the current terminal is repeatedly displayed for delay, and then the service information sent by the server is displayed.

The above is only the preferred embodiment of the disclosure and not intended to limit the scope of protection of the disclosure.

What is claimed is:

1. A service switching method in a local communication network, comprising:

sending, by a current terminal which has received a service switching starting instruction, running service information to a selected target terminal, and sending a service switching request message to a server;

sending, by the server which has received the service switching request message, service information to the target terminal;

extracting, by the target terminal, service progress times from the service information sent by the current terminal and the service information sent by the server respectively, calculating a time difference according to the extracted service progress times, and sending the time difference to the server; and regulating, by the server, a progress of the service information sent to the target terminal according to the time difference to make the progress consistent with a progress of the service information sent to the selected target terminal by the current terminal; and sending the regulated service information to the target terminal to switch the service information from the current terminal to the target terminal;

further comprising: before the running service information is sent to the selected target terminal, querying, by the current terminal, available target terminals in the local communication network, and generating a target terminal list;

wherein the target terminal list comprises at least one of: a terminal identifier, a terminal capability identifier, a terminal type, a corresponding manufacturer, a terminal version number, a terminal level, and a terminal capability;

wherein the terminal capability refers to software and hardware resources provided for a running service by the terminal;

wherein the terminal level refers to a security level, or running priority.

2. The method according to claim 1, further comprising: before the service information is sent to the target terminal, reading, by the server, locally stored target terminal capability information according to target terminal description information in the service switching request message, judging whether the target terminal is able to perform service switching or not according to the target terminal capability information and service description information in the service switching request message, and sending the service information to the target terminal when the target terminal is able to perform the service switching.

3. The method according to claim 1, further comprising: after the server regulates the progress of the service information sent to the target terminal according to the time difference, stopping, by the server, sending the service information to the current terminal.

4. The method according to claim 1, wherein the target terminal includes one or more target terminals.

5. The method according to claim 1, wherein the current terminal and the target terminal communicate with the server through different communication networks, respectively; or the current terminal and the target terminal communicate with the server through the local communication network;

wherein the local communication network refers to a near-field communication network or a local area network centred on a home gateway and a Wireless Fidelity (WIFI) hotspot.

6. The method according to claim 1, wherein the time difference refers to a time delay of same content sent to the target terminal through different transmission paths.

7. A service switching method in a local communication network, comprising:

sending, by a current terminal which has received a service switching starting instruction, running service information to a selected target terminal, and sending a service switching request message to a server;

sending, by the server which has received the service switching request message, service information to the target terminal;

extracting, by the target terminal, service progress times from the service information sent by the current terminal and the service information sent by the server respectively, and calculating a time difference according to the extracted service progress times; and regulating, by the target terminal, a progress of the service information sent by the server according to the time difference to make the progress consistent with a progress of the service information sent to the selected target terminal by the current terminal to switch the service information from the current terminal to the target terminal;

further comprising: before the running service information is sent to the selected target terminal, querying, by the current terminal, available target terminals in the local communication network, and generating a target terminal list;

wherein the target terminal list comprises at least one of: a terminal identifier, a terminal capability identifier, a terminal type, a corresponding manufacturer, a terminal version number, a terminal level, and a terminal capability;

wherein the terminal capability refers to software and hardware resources provided for a running service by the terminal;

wherein the terminal level refers to a security level, or running priority.

8. A service switching system in a local communication network, comprising:

a current terminal, configured to send running service information to a selected target terminal when receiving a service switching starting instruction, and send a service switching request message to a server;

the server, configured to send service information to the target terminal when receiving the service switching request message from the current terminal, and regulate a progress of service information sent to the target terminal according to a time difference to make the progress consistent with a progress of the service information sent to the selected target terminal by the current terminal; and to send the regulated service information to the target terminal to switch the service information from the current terminal to the target terminal; and the target terminal, configured to extract service progress times from the service information sent by the current terminal and the service information sent by the server respectively, calculate the time difference according to the extracted service progress times, and send the time difference to the server;

wherein the current terminal is configured, before sending the running service information to the selected target terminal, to query available target terminals in the local communication network, and generating a target terminal list;

wherein the target terminal list comprises at least one of: a terminal identifier, a terminal capability identifier, a terminal type, a corresponding manufacturer, a terminal version number, a terminal level, and a terminal capability;

wherein the terminal capability refers to software and hardware resources provided for a running service by the terminal;

wherein the terminal level refers to a security level, or running priority.

9. The system according to claim 8, wherein the target terminal includes one or more target terminals.

10. A service switching system in a local communication network, comprising:

a current terminal, configured to send running service information to a selected target terminal when receiving a service switching starting instruction, and send a service switching request message to a server;

the server, configured to send service information to the target terminal when receiving the service switching request message; and the target terminal, configured to extract service progress times from the service information sent by the current terminal and the service information sent by the server respectively, calculate a time difference according to the extracted service progress times, and regulate a progress of the service information sent by the server according to the time difference to make the progress consistent with a progress of the service information sent to the selected target terminal by the current terminal to switch the service information from the current terminal to the target terminal;

wherein the current terminal is configured, before sending the running service information to the selected target terminal, to query available target terminals in the local communication network, and generating a target terminal list;

wherein the target terminal list comprises at least one of: a terminal identifier, a terminal capability identifier, a terminal type, a corresponding manufacturer, a terminal version number, a terminal level, and a terminal capability;

wherein the terminal capability refers to software and hardware resources provided for a running service by the terminal;

wherein the terminal level refers to a security level, or running priority.

* * * * *